April 11, 1967   A. BROTHMAN ETAL   3,314,063
METER REGISTER GEAR ENCODER
Filed March 20, 1964   7 Sheets-Sheet 3
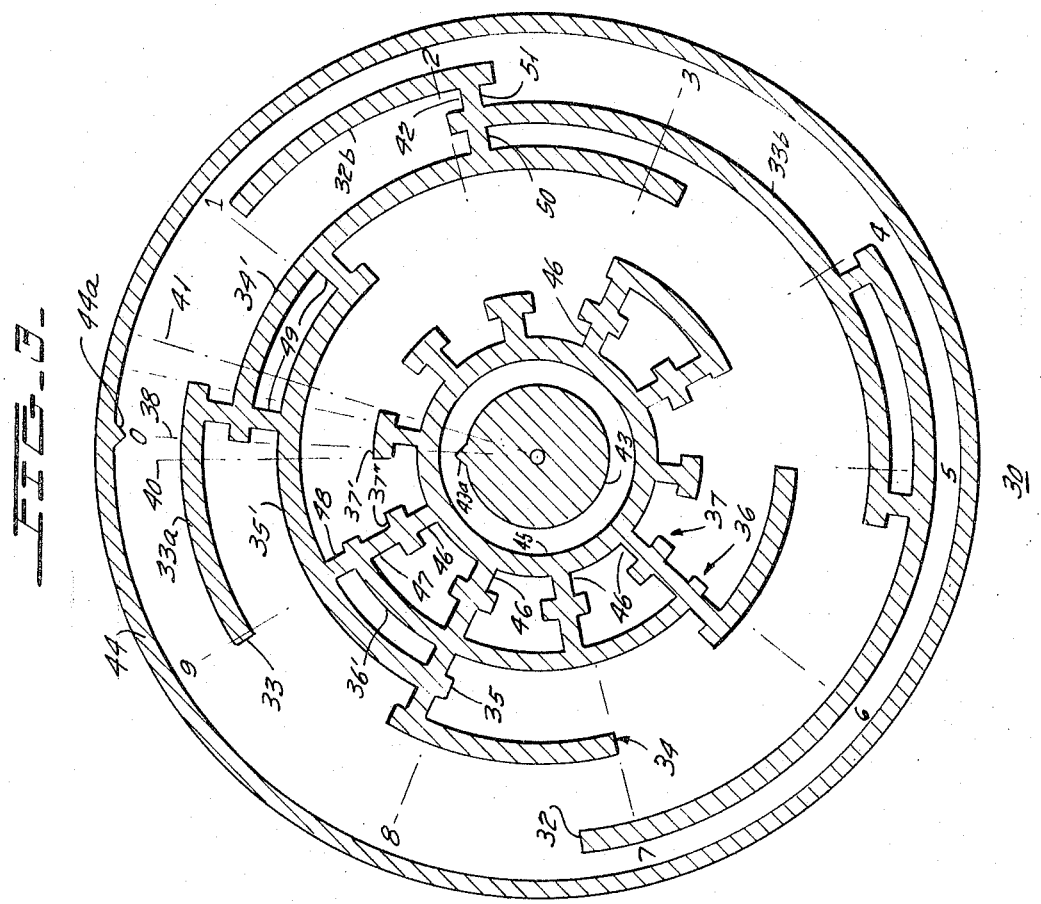
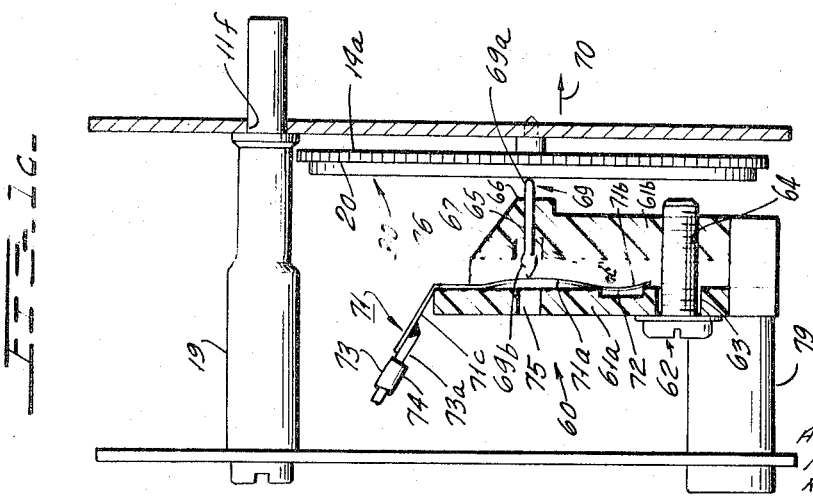
INVENTORS
ABRAHAM BROTHMAN
NATHANIEL L. KAHN
RICHARD D. REISER
BY
OSTROLENK, FABER, GERB & SOFFEN
ATTORNEYS

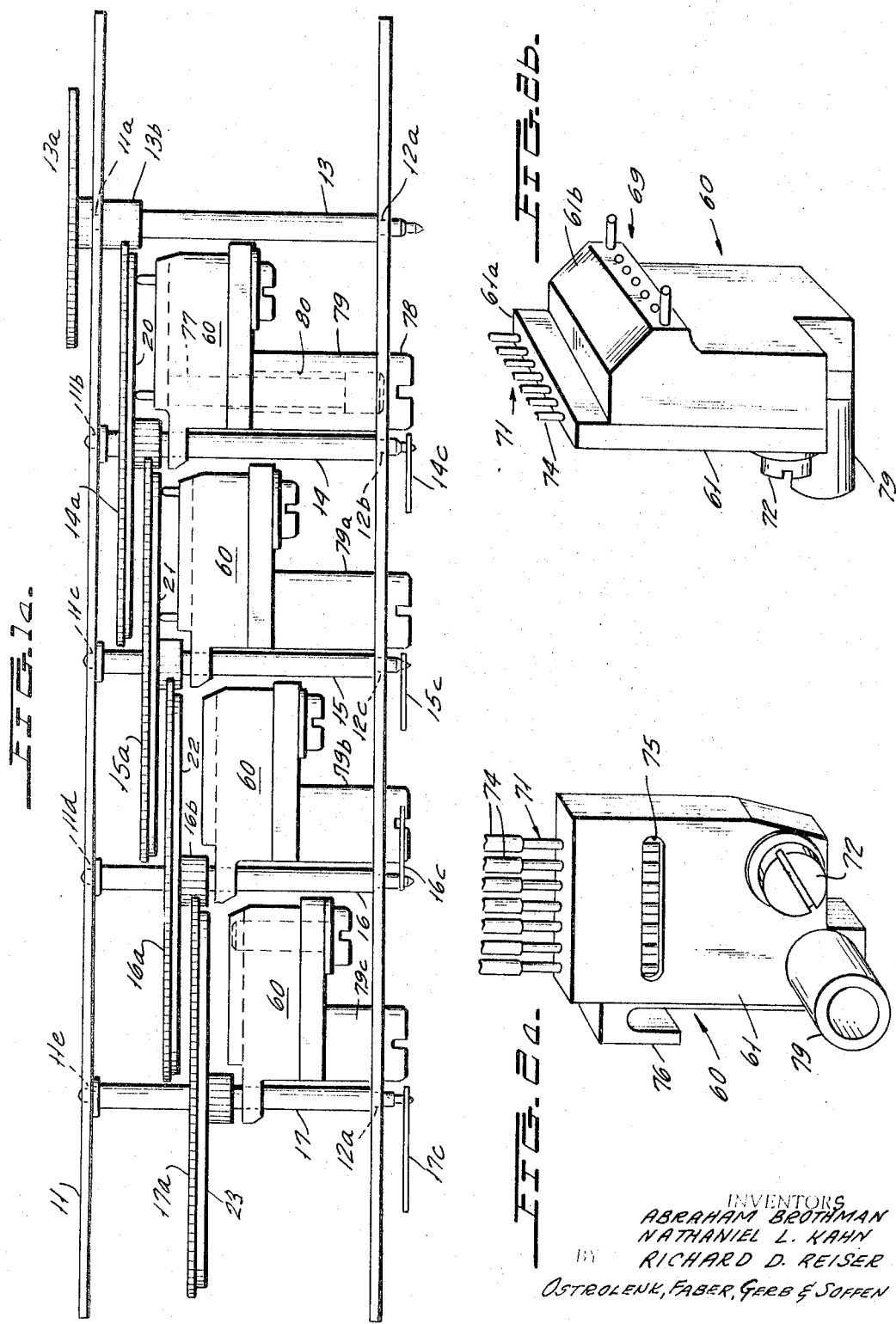

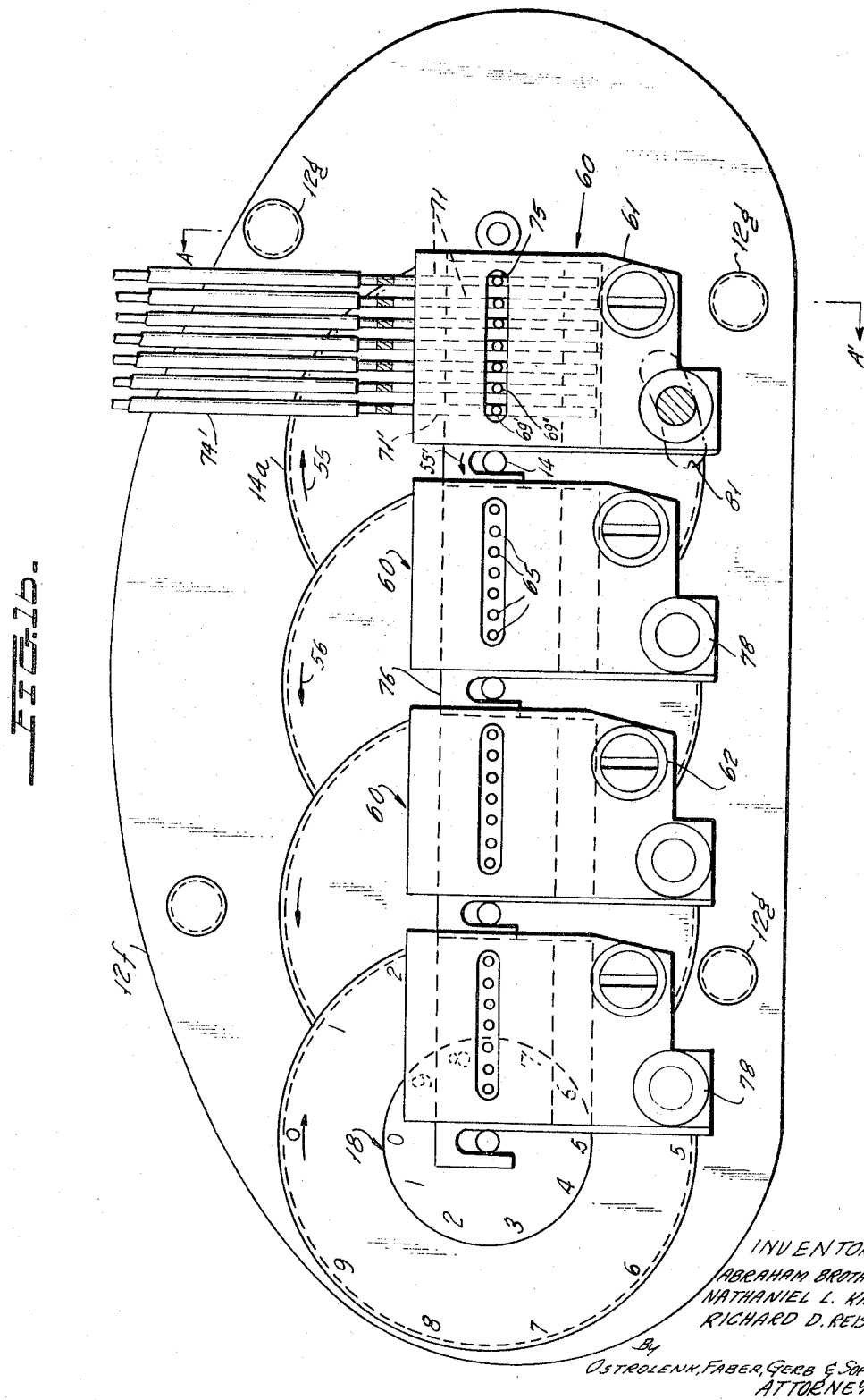

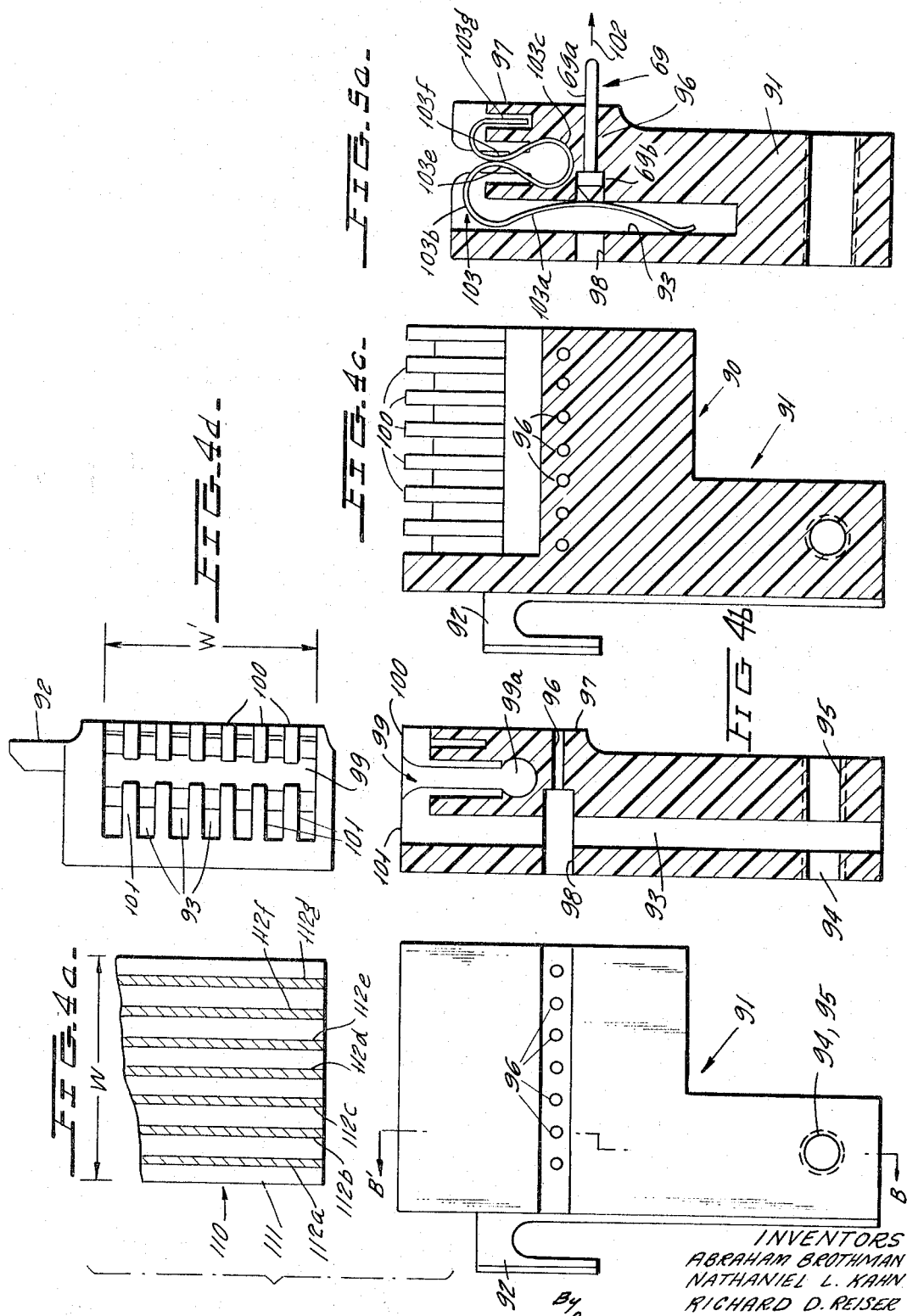

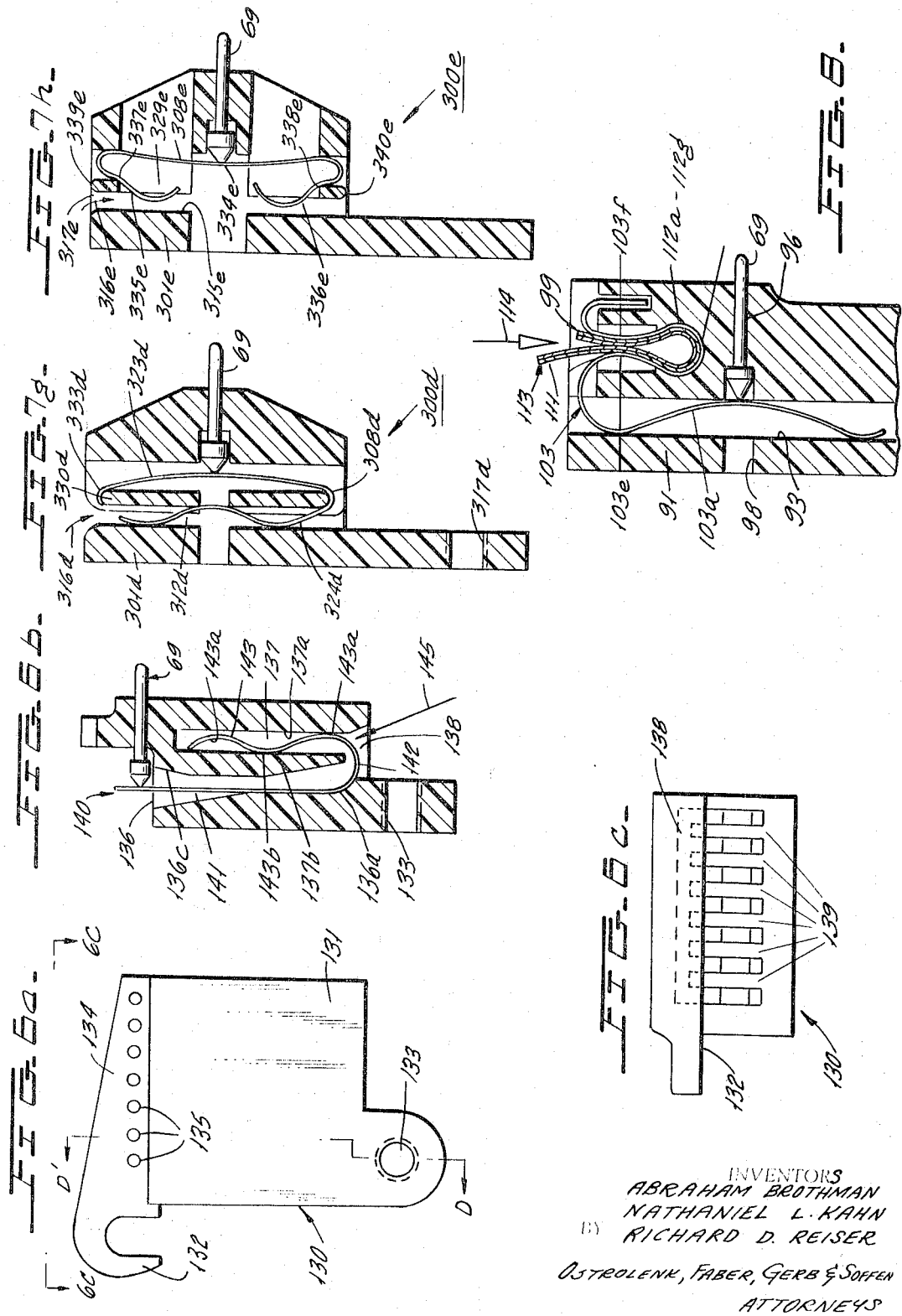

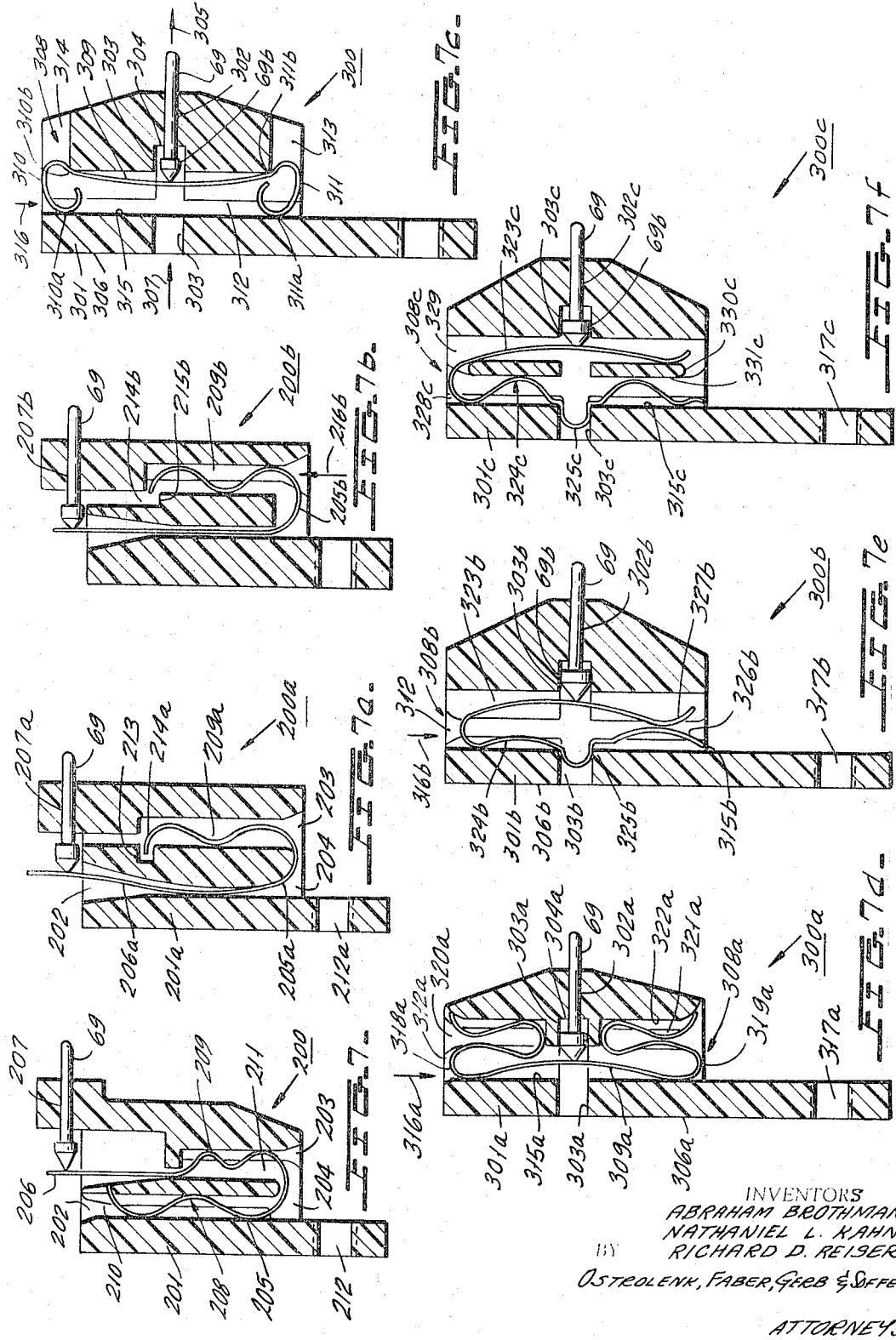

April 11, 1967     A. BROTHMAN ETAL     3,314,063
METER REGISTER GEAR ENCODER
Filed March 20, 1964     7 Sheets-Sheet 7

FIG. 9c. "4 OUT OF 6" AMB

| | 0 | 1 | 2 | 3 | 4 | 5 | 6 | 7 | 8 | 9 | 0 |
|---|---|---|---|---|---|---|---|---|---|---|---|
| A | 1 | 1 | 1 | 1 | 1 | 1 | 1 | 1 | 1 | 1 | 1 |
| 5 | 0 | 0 | 0 | 1 | 1 | 0 | 1 | 1 | 1 | 1 | 0 |
| 4 | 1 | 1 | 0 | 0 | 0 | 1 | 1 | 0 | 1 | 1 | 1 |
| 3 | 1 | 1 | 1 | 1 | 0 | 0 | 0 | 1 | 1 | 0 | 1 |
| 2 | 1 | 1 | 0 | 1 | 1 | 1 | 1 | 0 | 0 | 1 | 1 |
| 1 | 0 | 1 | 1 | 0 | 1 | 1 | 1 | 0 | 0 | 0 | 0 |
| DEC NOS. | 9-0 | 0-1 | 1-2 | 2-3 | 3-4 | 4-5 | 5-6 | 6-7 | 7-8 | 8-9 | 9-0 |

FIG. 9b. "3 OUT OF 5" AMB

| | 0 | 1 | 2 | 3 | 4 | 5 | 6 | 7 | 8 | 9 | 0 |
|---|---|---|---|---|---|---|---|---|---|---|---|
| A | 1 | 1 | 1 | 1 | 1 | 1 | 1 | 1 | 1 | 1 | 1 |
| 5 | 0 | 0 | 0 | 0 | 1 | 0 | 0 | 1 | 1 | 1 | 0 |
| 4 | 1 | 1 | 0 | 0 | 0 | 0 | 1 | 0 | 0 | 1 | 1 |
| 3 | 0 | 1 | 1 | 1 | 0 | 0 | 0 | 0 | 1 | 0 | 0 |
| 2 | 1 | 0 | 0 | 1 | 1 | 1 | 0 | 0 | 0 | 0 | 1 |
| 1 | 0 | 0 | 1 | 0 | 0 | 1 | 1 | 1 | 0 | 0 | 0 |
| DEC NOS | 9-0 | 0-1 | 1-2 | 2-3 | 3-4 | 4-5 | 5-6 | 6-7 | 7-8 | 8-9 | 9-0 |

FIG. 9a.

| | 0 | 1 | 2 | 3 | 4 | 5 | 6 | 7 | 8 | 9 | 0 |
|---|---|---|---|---|---|---|---|---|---|---|---|
| 6 | 0 | 0 | 0 | 0 | 0 | 0 | 0 | 0 | 0 | 0 | 0 |
| 5 | 0 | 0 | 0 | 1 | 0 | 0 | 1 | 1 | 0 | 0 | 0 |
| 4 | 1 | 0 | 0 | 0 | 0 | 1 | 0 | 0 | 1 | 1 | 1 |
| 3 | 1 | 1 | 1 | 0 | 0 | 0 | 0 | 1 | 0 | 0 | 1 |
| 2 | 0 | 0 | 1 | 1 | 1 | 0 | 0 | 0 | 0 | 1 | 0 |
| 1 | 0 | 1 | 0 | 0 | 1 | 1 | 1 | 0 | 0 | 0 | 0 |
| DEC NOS. | 0 | 1 | 2 | 3 | 4 | 5 | 6 | 7 | 8 | 9 | 0 |

INVENTORS
ABRAHAM BROTHMAN
NATHANIEL L. KAHN
RICHARD D. REISER
BY
OSTROLENK, FABER, GERB & SOFFEN
ATTORNEYS

United States Patent Office 3,314,063
Patented Apr. 11, 1967

3,314,063
METER REGISTER GEAR ENCODER
Abraham Brothman, Dumont, Nathaniel L. Kahn, Glen Rock, and Richard D. Reiser, Waldwick, N.J., assignors to Transitel International Corp., Paramus, N.J., a corporation of New Jersey
Filed Mar. 20, 1964, Ser. No. 353,362
19 Claims. (Cl. 340—347)

The instant invention relates to encoder means and more particularly to a novel encoder means arrangement for use with meter registers, wherein the meter register gear members perform the dual functions of gear operation as well as acting as the shaft angle encoder means, and further having novel sensing means for sensing the positions of the associated shaft angle encoders.

Meter registers find a wide variety of applications in many diverse fields. Meter registers are typically found in the home, forming an integral part of gas, electric and water meter units. Such meter registers are typically comprised of a gear assembly having a plurality of cooperating gear elements which are related to one another in a predetermined ratio so as to generate a visually readable indication of the quantity being measured. For example, in electric meters which read watt hours, the electric meter provides a mechanical output consisting of a rotating member which is coupled to the input of the meter register in order to drive the meter register gear train. Typically, the meter register is provided with four shafts, each being arranged to drive an associated pointer, which pointers cooperate with associated dial faces to provide a visually readable indication of the watt hours consumed by the user. The gear members of the gear train are normally associated with one another so as to maintain a 10–1 ratio between adjacent gears in order to provide a decimal output reading of the watt hours consumed. The least significant position is coupled in any suitable manner to the electric meter mechanical output and in turn drives the remaining elements of the gear train in order to generate the cumulative reading of watt hours consumed.

With the advent of automatic meter reading systems such as, for example, the meter reading system set forth in detail in copending U.S. application Ser. No. 91,043, now Patent No. 3,142,726, entitled Automated Meter Reading System, filed Feb. 23, 1961 by A. Brothman et al. and assigned to the assignee of the instant invention, it is desired in such systems to transmit meter readings of gas, water, or electrical meters, for example, from a plurality of remote points to a central location in order to completely avoid the need for manual reading of such meters, which method is presently being used throughout the country. In order to provide such an automated system, encoding means have been employed for digitizing the reading of such meters. The encoding means are mounted to the meter register gear shafts and provide a digital readout indicative of the angular position of the shafts. The digital readouts are then transmitted on demand by transmitter means over telephone lines, for example, to a central location, at which point all meter readings are processed within one central computer facility. Such an arrangement greatly simplifies calling operations which are presently in use, thereby resulting in a substantial reduction in the cost of taking the readings and subsequently billing the individual customers based on the readings obtained.

One typical shaft angle encoder presently employed in automatic meter reading system is described in application Ser. No. 125,247, filed July 19, 1961, now Patent No. 3,165,733, by A. Brothman et al., entitled, Code Stack Assembly and assigned to the assignee of the instant invention. In the above mentioned copending application a shaft angle encoder is described which is basically drum-shaped and adapted for mounting to a shaft such as, for example, the gear shaft, or the meter register. This arrangement necessitates the provision of gear shafts which are long enough to receive drum type shaft angle encoders and thereby requires a change in the present manner of manufacturing meter registers.

The instant invention utilizes a novel shaft angle encoder and accompanying sensing means which is totally compatible with present day meter registers and may be combined with such meter registers without any alteration whatsoever in present day meter register design and/or assembly.

The instant invention is comprised of a meter register of substantially typical design in which a plurality of gear shafts are provided with the gear shafts being rotatable by means of a gear train comprised of a plurality of gear members, each being mounted upon an associated gear shaft, and further being arranged so that the gear ratios between adjacent gears is a 10:1 ratio.

Each individual gear shaft is provided with first and second gear elements mounted thereto wherein the first of said gear elements has a substantially large radius and the second of said gear elements has a substantially small radius. The large radius gear member is arranged to mesh with a small radius gear member mounted to the adjacent gear shaft on one side, while the small radius gear member is arranged to mesh with the large radius gear mounted to the gear shaft on the opposite side thereof.

One surface of each large radius gear shaft mounted to rotate about an associated gear shaft is provided with a printed circuit configuration composed of a plurality of annular conductive rings of varying arcuate lengths, which arcuate conductive segments cooperate with a plurality of associated sensing fingers to generate a digital code representative of the angular position of the shaft. The printed circuit configuration of the shaft angle encoder disc may be provided upon an insulating substrate which, in turn, is secured to one surface of the large radius gear member, or as an alternative, the gear member itself may be formed of an insulating material and hence act as the insulating substrate which receives the printed circuit configuration of the shaft angle encoder disc. Thus the gear member becomes a single integral unit which provides the function of acting as one element of the register gear train and simultaneously therewith provides the function of the shaft angle encoder. The readout assembly for the shaft angle encoder is comprised of a housing means which is arranged to position and support the plurality of sensing fingers, each of which cooperates with an associated annular ring of the shaft angle encoder disc. The housing member is preferably a unitary piece molded from a suitable plastic material and having a plurality of openings for receiving and reciprocally mounting the sensing fingers. Individual biasing members are provided for each sensing finger. When the biasing members are properly positioned within the sensing finger housing a portion of the biasing member makes both physical and electrical contact with one end of its associated sensing finger acting to urge the sensing finger so that its opposite end makes wiping contact with the annular ring of the code disc with which it is associated. The first end of each biasing member is connected to suitable transmitter means for transmitting the digitized information sensed by each sensing finger from the remote location at which the register means is located to some central location for processing or other use of the digitized meter reading. Thus the biasing member acts not only as a mechanical means for urging each sensing finger into wiping contact with the code disc, but further acts as the electrical means by which the transmitter input is connected to the sensing finger arrangement.

Each biasing member is designed so as to operate completely independent from the remaining biasing members. This is a distinct advantage over providing a single biasing member for all of the sensing fingers due to the fact that any individual sensing member undergoes movement and bears against the single biasing member. This movement of the sensing member may be imparted through the single biasing member to the other sensing members so as to cause a decrease in the contact pressure between the sensing fingers and the surface of the code disc. By the employment of individual biasing members for each sensing member, any movement along the sensing finger longitudinal axis will be imparted only to its associated biasing member and not to any other biasing member and hence any other sensing finger.

The biasing means employed is comprised of a metallic spring member of suitable resiliency, which spring member is bent into a configuration so that one portion thereof bears against the associated sensing finger to provide the necessary contact pressure and another portion thereof is readily available for electrical connection to suitable lead wires leading between the shaft angle encoder assemblies and the transmitter mechanism which may be employed for transmission of data from the encoder assembly location to some remote position.

Present day installations where simplification of installation as well as miniaturization of components is not only highly desirable, but an important design requirement, it has become quite advantageous to employ connecting means which is typically known as flexible printed circuitry. Such flexible printed circuitry is normally comprised of an insulating substrate which is highly flexible so that it can be bent to almost any degree without destroying or otherwise damaging the printed circuitry which is provided on one surface of this flexible, tape-like material. The flexible printed circuitry is highly desirable for use in connecting a plurality of terminals between two electrical components. For example, in the instant application such flexible printed circuitry may be employed for connecting the outputs of the sensing fingers to the input terminals of the transmitter means employed to transmit the digitized data to a remote location. The flexible printed circuitry in one exemplary embodiment is comprised of a plurality of spaced substantially parallel conductive segments, each running the full length of the flexible tape with a first end of each segment being connectible to the sensing finger elements and the second end of each of the elements being connectible to the input terminals of the transmitter means. In the instant invention the connection between the flexible printed circuitry and the sensing fingers is greatly simplified by designing each of the biasing spring members in such a manner as to cause a pressure fit to be made between the biasing spring elements and the flexible printed circuitry when a first end of the flexible circuitry is inserted within an opening in the sensing finger and biasing member housing. By exposing the electrical surface of each segment on the flexible printed circuitry near a first end thereof, it is possible that electrical as well as physical engagement be made between the flexible printed circuitry segments and the individual associated biasing members. Sufficient contact pressure is designed into the assembly so as to completely avoid the need for any additional securement means or for any soldering of connections. The connection between the flexible printed circuitry and the sensing finger biasing members may likewise be readily severed simply by withdrawing the flexible printed circuit member from the sensing finger housing. This arrangement greatly simplifies installation and maintenance procedures thereby reducing expenditures in this area by significant amounts.

The sensing finger and biasing member housing is preferably formed of a plastic material and is provided with a first hook-type arrangement which is positioned around the gear shaft of the combined gear-code disc with which the sensing finger assembly is associated. The dial face of the meter register, which in the case of a register providing a decimal readout is normally referred to as a decade register and is provided with a plurality of arcuate-shaped slots, each being associated with an individual sensing finger assembly. Each sensing finger assembly is provided with an aperture which cooperates with an associated slot and suitable fastening means enabling the sensing finger assembly to undergo rotation about its associated gear shaft within the limits of the arcuate slot for the purpose of aligning all of the sensing fingers within the sensing finger housing so that they all lie along a radial line of the code disc. After proper positioning of the sensing finger housing the fastening means may then be secured in order to retain the sensing finger housing in the proper position. The adjustment may freely be made after the meter register is fully assembled, thus in no way effecting the normal assembly operations of such decade registers. In addition thereto, the sensing finger housing assemblies may even be mounted to the meter registers subsequent to the assembly operation of the register.

The use of the encoder means of the instant invention in no way effects the normal functions of a meter register, namely that of providing a visually observable indication of the meter reading. The normal dial face and pointer arrangement may still be read in the normal manner if so desired in order to provide a check between the physical reading and the digital reading provided by the encoder means. The encoder means of the design described herein imparts no significant drag to the meter register and in no way affects the accuracy of the meter register either on a short-term or a long-term basis. Thus the arrangement described herein provides a combined meter register gear encoder assembly which physically differs very little in appearance from present day meter registers and further, has overall physical dimensions which are identical to existing meter registers enabling the use of the meter register of the instant invention in all existing utility meters, such as water, gas and electric meters, as well as any other meters which use meter registers of the type described herein.

It is therefore one object of the instant invention to provide a meter register which incorporates shaft angle encoding capabilities together with the normal functions of said register.

Still another object of the instant invention is to provide meter registers for use in utility meters and the like wherein novel encoder means are provided within the register for digitizing the shaft angle positions of the register gear shafts.

Another object of the instant invention is to provide a meter register for use in utility meters and the like wherein the meter register gear members provide the dual functions of operating as gears simultaneously with the function of acting as the code disc of a shaft angle encoder.

Still another object of the instant invention is to provide meter registers for use in utility meters, such as, water, gas and electric meters and the like wherein novel sensing finger assemblies are employed for providing the dual function of suitable contact pressure between sensing finger and code disc, as well as electrical contact between the shaft angle encoder assemblies and any output utilization means.

Another object of the instant invention is to provide meter register means for use in utility meters and the like wherein shaft angle encoder sensing finger assemblies are provided having novel sensing finger biasing members for cooperation with flexible printed circuit members to facilitate connection of the sensing finger assemblies with output utilization devices.

Still another object of the instant invention is to provide novel meter register means for use in utility meters and the like wherein novel encoder assembly sensing finger housings are provided which permit simple, rapid adjustment of the sensing finger assembles to insure radial alignment of the individual sensing fingers.

These and other objects of the instant invention will become apparent when reading the accompanying description and drawings in which:

FIGURE 1a is a top view of a meter register gear encoder designed in accordance with the principles of the instant invention.

FIGURE 1b shows a front view of the assembly of FIGURE 1a.

FIGURE 1c is a cross-sectional view of the assembly of FIGURE 1b taken along the line A–A'.

FIGURES 2a and 2b are perspective figures showing the sensing finger assembly employed in FIGURES 1a–1c.

FIGURE 3 shows a code disc employed in the assembly of FIGURES 1a–1c.

FIGURE 4a is a top view of an alternative embodiment of the sensing finger assemblies of FIGURES 1 and 2.

FIGURE 4b is a cross-sectional view of the assembly of FIGURE 4a taken along the line B–B'.

FIGURE 4c is a cross-sectional view of the assembly of FIGURES 4a and 4b taken along the line C–C' of FIGURE 4b.

FIGURE 4b is an end view of the embodiment of FIGURES 4a–4c.

FIGURE 5a is a view substantially identical to that shown in FIGURE 4b with the biasing member and sensing finger being mounted within the assembly.

FIGURE 6a is a top view of an alternative embodiment for the sensing finger assembly of FIGURES 4a–5a.

FIGURE 6b is a cross-sectional view taken along the lines D–D' of FIGURE 6a.

FIGURE 6c is an end view of the assembly shown in FIGURES 6a and 6b.

FIGURES 7–7h are cross-sectional views of alternative embodiments of the sensing finger assembly.

FIGURE 8 is a top view showing a sensing finger assembly in combination with a flexible printed circuit member.

Referring now to the drawings, FIGURES 1a–1c show a meter register gear encoder 10 adaptable for use with meters such as, for example, utility meters of the gas, electric, or water type. The meter register which is commonly referred to as a decade register, since it is of the type that provides a visually readable decimal output, is comprised of first and second substantially flat plates 11 and 12 with plate 11 being a back plate and plate 12 being a face plate. Plates 11 and 12 are provided with apertures 11a–11e and 12a–12e, respectively, for positioning and rotatably mounting a plurality of gear shafts 13–17, respectively. The first, or input shaft 13 is provided with a first gear member 13a which is driven by the meter mechanical output means (not shown) which is normally some rotating means such as, for example, another gear, to impart rotation through the gear 13a in order to drive meter register 10 to provide the desired reading. Rotation of gear 13a about its central axis is imparted simultaneously to the shaft 13 and to a second gear member 13b of a substantially smaller radius, which gear 13b is meshed with a gear member 14a mounted for rotation about shaft 14. Rotation of gear 13b is imparted to gear member 14a which simultaneously imparts rotation to shaft 14 and to gear member 14B mounted for rotation on shaft 14.

Gear 14b rotates at the same angular velocity as gear member 14a and imparts its rotation to a gear 15a mounted for rotation on shaft 15. In the case where the meter register 10 of FIGURES 1a–1c is of the decade type (i.e., of the type which provides a decimal output reading) the gear ratio between gears 14b and 15a is a 10:1 ratio. This means that gear 14b must experience 10 complete revolutions for every one revolution which the gear 15a completes. Similar relationships exist between the gears 15b and 16a; 16b and 17a.

Each of the shafts 14–17, respectively, is provided with a pointer member 14c–17c, respectively, mounted at the forward end of each shaft. As each shaft 14–17 rotates any rotational movement is imparted to the pointer associated with each shaft. Each pointer cooperates with a dial face provided on the surface 12f of the front plate 12. Only one such dial face and pointer 18 and 17c, respectively, is shown in FIGURE 1b for purposes of simplicity. As can be seen in FIGURE 1b, the dial face is graduated so as to provide readings from 0–9, depending upon the position of the pointer 17c. For example, in FIGURE 1b, the position of pointer 17c relative to dial face 18 provides a reading of 6. In the register of FIGURES 1a–1c it being noted that there are four such dial faces, register 10 is thereby capable of providing any reading from 0000–9999. The dial face 18, shown in FIGURE 1b, indicates the reading of the most significant digit. From the position of pointer 17c approximately ½ way between the numbers 6 and 7 it can be assumed that the remaining portion of the reading will not be zero and will probably be in the range of 400–600. The remaining dial faces provided for each of the remaining shafts 14–16, while not shown, should be understood to be substantially identical to the dial face 18 of FIGURE 1b.

The gear train assembly of the meter register is secured together by the fastening means 19, shown in FIGURE 1c, which is so designed as to maintain the front and back plates 12 and 11, respectively, in the spaced relationship shown in FIGURES 1a and 1c. The front plate 12 is provided with suitable apertures 12g for receiving an associated fastening assembly. The back plate 11 is likewise provided with suitable apertures, such as, for example, the aperture 11f, shown in FIGURE 1c.

Each of the large radius gear members 14a, 15a, 16a and 17a is provided with a surface 20–23, respectively, each of said surfaces having a printed circuit configuration of the type shown in FIGURE 3.

The encoder disc 30 of FIGURE 3 is a printed circuit configuration which is provided on an insulated substrate 31 in any well known manner with the encoder disc having six annular rings 32–37, respectively, each of said rings having a plurality of arcuate conductive segments. For example, the annular ring 32 is provided with two conductive segments 32a and 32b; annular ring 33 is provided with arcuate conductive segments 33a and 33b; and so forth, as to generate a unique code having a bit length of six binary bits. The code is so arranged that in order to identify clearly a single number the binary code is a two-out-of-five self-checking type code. That is, out of five possible binary bits, only two of these bits are in the binary one condition. At the transition between two numbers, however, from the visually observable viewpoint, it is normally difficult to distinguish which side of the transition point the pointer is located. For example, considering FIGURE 3, the region between the dashed lines 38 and 39 represents the decimal number zero, however, to the immediate left of the line 38 lies the region for the decimal number 9 and a pointer lying in the region of the line 38 may from the visually observable viewpoint lie on either side of the line 38. The code on code disc 30 takes this into consideration by adding to the five bit code an ambiguity bit to identify the fact that the decimal reading for that code disc lies in the transitional region between two numbers such as, for example, the region of line 38. In addition to the tagging on of an ambiguity bit to the two-out-of-five code, the region in which the ambiguity bit is in the binary one state also indicates the fact that a transition to a three-out-of-five code will take place. For example, consider the charts of FIGURES 9a, 9b and 9c, respectively, in conjunction with FIGURE 3. Let it be assumed that the dial pointer lies to the left of line 38 and well away from the ambiguity region. This means that the code disc 30 will generate the code for the decimal number 9, as shown in FIGURE 9a, which binary code is 010100. As the pointer moves in the close proximity and near coincidence with the line 38, the ambiguity bit which is in the annular ring 37 is picked up by the ambiguity sensing finger in a manner to be more fully described, so as to generate a two-out-of-five + ambiguity bit code which is represented by the 9–0 line of the chart in FIGURE 9b, wherein the binary code is 010101. As the pointer moves to the right of the line 38, the code picks up an additional binary bit to become a three-out-of-five + ambiguity bit code. This is represented by the 9–0 line of the chart of FIGURE 9c and the binary code then becomes 011101. As the pointer moves well to the right of the line 38, the ambiguity bit is dropped and the bit of annular ring 33 is likewise dropped in order to generate a clear decimal zero representation of 001100, shown at the top line of the chart of FIGURE 9a. Thus it can be seen that the pie-shaped region defined by the two radial lines 40 and 41 which contain the line 38 identify the fact that the transitional region between the decimal 9 and the decimal zero occurs in this pie-shaped area. This transitional region is identified by the ambiguity bit, such as, for example, the ambiguity bit 37' in the annular ring 37 and it is also this region wherein the binary one state in annular ring 33 is dropped and the binary one state in the annular ring 34 is picked up. Each remaining line between decimal numbers such as, for example, the lines 39, 42 and so forth, for the decimal cut-off between 0 and 1, 1 and 2, and so forth, has a like ambiguity bit or ambiguity conductive segment which identifies a pie-shaped transitional region in which the code change takes place.

In addition to this unique feature, other unique features of the code can thus be seen from a consideration of the charts of FIGURES 9a–9c. Considering the chart of FIGURE 9a, it can be seen that between any two adjacent decimal numbers, one of the two binary one bits is always identical so that only one binary bit changes through any transitional region. For example, decimal zero is represented by 001100 and decimal one is represented by 101000. The fourth binary bit from the left in the decimal zero representation thus becomes a binary zero, while the first binary bit in the left of the decimal one becomes a binary one. However, the third binary bit from the left in both decimal zero and decimal one remain the same, as can be seen from the column 3 in the chart of FIGURE 9a. This arrangement greatly eliminates possible error in the code generation. The same can be seen to be true of the codes for the charts of FIGURES 9b and 9c as well. For example, in going from decimal 9 to the decimal 9–0 transitional region, the code goes from 010100 to 010101, there being only one change in the code, that is the pick-up of the ambiguity bit with the binary ones of columns 2 and 4 remaining identical. Turning to the chart of FIGURE 9c, the transition then goes to 011101 with the pick-up of a binary one in column 3. The next transition goes from the chart of FIGURE 9c to the chart of FIGURE 9a in which the code goes from 011101 to 001100 in which the ambiguity bit is dropped and the binary one of column 2 is also dropped. For purposes of simplicity a fourth chart has not been included herein, but it can clearly be seen from a consideration of FIGURE 3 that the binary one bit of column 2 of the chart in FIGURE 9c is dropped before the ambiguity bit 37' is dropped. This can be seen from a consideration of the radial line 41 which is in alignment with the right-hand edge of segment 37', but which extends to the right of the right-hand edge of segment 33a. Thus the code generation throughout the entire revolution of the code disc never makes two binary one transitions simultaneously. Just by a brief review, it can be seen that as the pointer approaches the radial line 40, the two-out-of-five code for decimal 9 is generated. As soon as the pointer crosses over the radial line 40 the two-out-of-five + ambiguity bit code is generated for the decimal 9. The next transition becomes that of a three-out-of-five code with the ambiguity bit wherein the arcuate segment 34' of annular ring 34 is picked up. The next transition becomes the dropping of the annular segment 33a of annular ring 33. The final transition takes place when the arcuate segment 37' is dropped. Thus the code goes from two-out-of-five to two-out-of-five + ambiguity bit, to three-out-of-five + ambiguity bit to two-out-of-five + ambiguity bit and finally back to two-out-of-five. This identical transition takes place at the cross-over area between each decimal number around the dial face.

A further consideration of the code disc 30 of FIGURE 3 shows that the central portion of disc 30 is provided with a circular segment 43 having a narrow-shaped projection or pointer portion 43a. The code disc 30 is provided with an annular ring 44 surrounding its periphery which is provided with an arrow-shaped projection 44a which points in the direction of projection 43a. These two projections may be joined by the imaginary line 38 and are employed for the purpose of aligning the sensing fingers along a radius of the code disc 30, in a manner to be more fully described. Code disc 30 is provided with still one more annular ring 45. This annular ring cooperates with a sensing finger to be more fully described, which supplies a D.-C. voltage level to closed ring 45. This D.-C. level is electrically connected to the remaining annular rings 32–37 by means of radially aligned conductive segments. For example, each ambiguity segment in the annular ring 37 is connected to the continuous annular ring 45 by the segments 46. The segments of annular ring 36 are connected to annular ring 45 by means of the radial segments 47, the arcuate segments of annular ring 37 and by the radial segments 47. This can similarly be found to be true for all other remaining arcuate segments provided on code disc 30. As one further example, consider the outermost arcuate segment 32b in the annular ring 32. A continuous conductive path can be traced from this segment through radial segment 51, arcuate segment 33b, radial segment 50, arcuate segment 34b, radial segment 49, arcuate segment 35', radial segment 48, arcuate segment 36', radial segment 47, arcuate segment 37" and finally, radial segment 46 to the continuous conductive circular loop 45. Thus, from the code arrangement herein, it can be seen that each annular ring 32–37 is provided with a sensing finger making sliding engagement with the segments of its associated annular ring with the segments conveying a voltage level or signal to a sensing finger upon wiping contact therebetween and with no voltage level or signal being imparted to a sensing finger when it fails to make contact (i.e. is positioned upon the insulating substrate of the annular ring and not upon the conductive segment).

Returning to a consideration of FIGURES 1a–1c, it should be understood that code discs of the type 30 shown in FIGURE 3 are provided on each of the surfaces 20, 21, 22, and 23 of the gear members 14a, 15a, 16a and 17a, respectively. As was previously described, the code disc may be secured to a metal or insulating gear member or the gear member may be formed from an insulating substrate and may have the printed circuit configuration of FIGURE 3 placed directly upon one surface thereof. Naturally, the provision of a single insulating gear member having the printed circuit configuration thereon is preferable from the viewpoint of reduction of the number of elements comprising the over-all assembly. One important thing to note is that each adjacent gear member will rotate in a reverse direction. For example, consider FIGURE 1b and the gear shaft 14. Let it be assumed that this gear shaft rotates clockwise as indicated by the arrow 55. The clockwise rotation is imparted by means of gear 14b to gear 15a causing the gear 15a, the gear 15b and the gear shaft 15 to rotate counterclockwise as represented by arrow 56. In a like manner, the gear shaft 16 will rotate at the clockwise direction, while the gear shaft 17 will rotate in the counterclockwise direction. This operation is taken care of by providing code discs which are positioned adjacent to one another by the mirror images of one another. For example, the gear members 14a–16a may be provided with code discs of the type shown in FIGURE 3. The gears 17a and 15a, however, must be provided with code discs which are identical to one another and also which are mirror images of the code discs provided on the gear members 16a and 14a. Such an arrangement will preserve the decimal code relationships and hence will not affect the normal operation of the gear chain nor will they affect the output reading, but the output reading available will be correct as shown.

The sensing finger assembly 60 provided for each disc is shown in perspective view in FIGURES 2a and 2b as well as the plan views of FIGURES 1a–1c. The sensing finger assembly 60 is comprised of a housing 61 formed from any suitable insulating material, such as a plastic, plexi glass and the like. The housing 61 may be formed as a single unitary piece through an injection molding process and the like, or may be formed of two elements which are secured together by fastening means in a manner to be more fully described. In the arrangement of FIGURES 1a–2b the housing 61 is comprised of two cooperating elements 61a and 61b. This can best be seen in FIGURES 1c wherein the two elements 61a and 61b are secured to one another by the fastening means 62 which passes through an opening 63 in member 61a and is threadedly engaged with a tapped aperture 64 in element 61b. The element 61b is provided with seven apertures 65 (see FIGURES 1b and 1c) which communicate with the bottom edge 66 at one end thereof and which communicate with a wider diameter opening 67 at the other end thereof. The two openings 65 and 67 form a ledge 68 therebetween. Each one of the seven openings 65 is arranged to receive a sensing pin 69 having an elongated pin-shaped portion 69a and a head portion 69b. The diameter of the elongated portion 69a permits this portion to be readily inserted within opening 65. The head 69b will readily pass through the opening 67, but will prevent the pin from moving to the right in the direction shown by arrow 70 of FIGURE 1c, thus limiting the amount of motion which the pin 69 can experience in the right-hand direction relative to the FIGURE 1c. A similar pin to the pin 69 is provided in each of the openings 65. As can be seen in FIGURE 1c, the extreme right-hand tip of pin 69 makes sliding engagement with the surface of printed circuit member 20 provided on the gear member 14a. Adequate contact pressure for the sensing pin 69 is provided by means of the biasing spring member 71 having a central portion 71a which bears against the point of head portion 69b of the pin 69. One end portion 71b of biasing member 71 is bent so as to lock into a cavity 72 provided in the housing element 61a. The opposite end 71c of biasing member 71 is bent so as to receive one end 73a of a conductor 73 which may, for example, be covered with insulating sleeve 74. This conductor 73 electrically connects each of the associated sensing pins to a transmitter, or other similar means for transmission or transfer of the digitized data to some remote location. The housing element 61a is further provided with an elongated slot 75, which can best be seen in FIGURES 1b and 1c, which elongated slot is positioned immediately above the opening 65. This arrangement permits the elements 61a and 61b to be secured to one another by fastening means 62 prior to the insertion of the sensing pins 69 in the opening 65. This may be done simply by dropping the sensing pin 69 into the opening 65 through the elongated slot 75.

The individual biasing members 71 (see FIGURES 1b and 1c) may then be "snapped" into position within the cavity 76 lying between and defined by the housing elements 61a and 61b. Each biasing member 71 is designed to urge its associated sensing pin in the direction shown by arrow 70, in order to provide suitable contact pressure between the right-hand tip of sensing pin 69 and the surface of the code disc 20. As can be seen in FIGURE 1b, all of the sensing pins 69 are arranged along a straight line, which straight line passes through the center point of the gear shaft 14 and hence lies along a radius of the gear member 14a. Each of the sensing fingers, or pins 65 are so positioned as to make wiping contact with an associated annular ring of the code disc 30, shown in FIGURE 3. For example, the sensing pin 69′ makes wiping engagement with the closed conductive ring 45; sensing pin 69″ makes wiping engagement with the ambiguity segments of annular ring 37; and so forth. For the purpose which was previously described, the conductor 74′ has its upper end (see FIGURE 1b) secured to a suitable signal or voltage source, which voltage is connected through conductor 74′, biasing member 71′ and sensing pin 69′ to the continuous conductive loop 45 of the code disc 30, shown in FIGURE 3. Each remaining annular ring about the code disc 30 is connected to its associated conductor 74 in a similar manner.

Each sensing finger assembly 60 is mounted to the register 10 by means of a substantially hook-shaped projection 76, which can best be seen in FIGURES 1a, 1b and 2a, with the hook-shaped portion being positioned around a gear shaft such as, for example, the gear shaft 14. Each assembly 60 is further provided with a tapped opening 77 which is designed to receive a fastening member 78, which can best be seen in FIGURE 1a. The head of the fastening member 78 bears against the surface of face plate 12 and is threaded so as to threadedly engage the opening 77. The sensing pin assembly 60 is linearly positioned relative to shaft 14 through the use of a cylinder or spacer member 79 having a hollow central portion 80 for receiving the threaded screw member 78. The spacer 79 has a first surface bearing against face plate 12 and a second surface bearing against element 61a of the housing 61 so that when member 78 is securely fastened to housing 61 this appropriately positions the sensing pin assembly 60. The threaded fastening member 78 passes through an arcuate shaped slot 81 provided in face plate 12 and which can best be seen in FIGURE 1b. The arcuate slot 81 permits a rotation either clockwise or counterclockwise of the sensing pin assembly 60 about the shaft 14 in the directions shown by arrows 55 and 55′, respectively. This rotation is confined to the limits of the length of arcuate slot 81. The purpose of arcuate slot 81 is to permit the sensing finger assembly pins 69 to be radially aligned along the imaginary line 38 between the two projections 43a and 44a provided on each code disc 30 and shown in FIGURE 3. The assembly and alignment of each sensing finger assembly is very readily performed, simply by placing the hook-shaped projection 76 about the shaft 14, putting the spacer 79 in its appropriate position and passing the threaded fastening member 78 through the elongated slot 81 and spacer 70 so that it may be threadedly engaged with the sensing pin assembly housing 61. The fastening member 78 may then be loosely fastened thereto and to a sufficient degree to permit the sensing pin assembly to be rotated about its pivot which is the gear shaft 14. When the sensing pins are appropriately aligned between an imaginary line connecting the projections 43a and 44a of FIGURE 3 the fastening member 78 may then be tightened to retain the sensing finger assembly in its appropriate position. The length of the spacer 79 is chosen so that each sensing pin 69 through its associated biasing member 71 will exert sufficient contact pressure upon the printed circuit surface of each code disc. Considering FIGURE 1a, it can be seen that while each sensing pin assembly is identical the spacer members 79, 79a, 79b and 79c are all of different lengths to allow for the differences in the distance between the surface of each code disc and the face plate 12. It can clearly be seen that spacer 79a is shorter than spacer 79; spacer 79b is shorter than spacer 79a; and so forth. Each spacer, in turn, is designed to position the sensing pin assembly so that its sensing pins will exert sufficient contact pressure upon the code disc printed circuit surface.

An alternative embodiment for the sensing pin assembly 60 of FIGURES 1a–2b is shown in FIGURES 4a–4d and 5a. This embodiment is specifically designed for use with a flexible printed circuit member, to be more fully described. The sensing pin assembly 90 of FIGURES 4a–4d and 5a, respectively, is comprised of a single unitary molded member which may be formed by an injection molding operation is generally designated by the numeral 90 of FIGURES 4a–4d and 5a. It should be understood that while it is preferable to form the sensing pin assembly 90 as a single molded member, it may be formed of two or more elements, if desired. The assembly 90 is comprised of a housing member 91 having a hook-shaped projection 92 along one side thereof. This hook-shaped projection 92 is substantially identical in both configuration and function to the hook-shaped projection 76 of the sensing pin assembly 60, shown in FIGURES 1a–2b. The housing 90 is provided with a plurality of spaced parallel cavities 93, which can best be seen in FIGURES 4b and 4d. Each cavity 93 runs substantially the entire length of the housing 91 and has a substantially rectangular cross-section, which can best be seen in FIGURE 4d. One end of the housing 91 is provided with first and second openings 94 and 95 which are provided on opposite sides of the cavity 93. This opening is tapped to receive a threaded fastening member substantially identical to the threaded fastening member 78, shown in FIGURES 1a and 1c.

The lower portion of the housing 91 is provided with seven openings 96, each of which is designed to receive a sensing pin 69 which is substantially identical to the sensing pins 69 shown in FIGURES 1a–1c having an elongated portion 69a and a head portion 69b (see FIGURE 5a); the lower end of each opening 96 communicates with the bottom surface 97 of housing 91 and the upper end communicates with a larger diameter opening 98. The openings 98 and 96 are substantially identical in both design and function to the openings 65 and 67 provided in the sensing pin assembly 60 of FIGURES 1a–2b. Housing 91 is further provided with an elongated cavity 99 which is substantially divided into well defined regions by means of the spacing members or ribs 100 and 101 which lie immediately below and above, respectively, the cavity 99. The rear end of the cavity 99a is substantially circular-shaped, which can best be seen in FIGURE 4b. Turning specifically to FIGURE 5a, the manner in which the sensing pins 69 are inserted in each of the openings 96 is shown therein. Each sensing pin 69 is biased in the downward vertical direction, as shown by arrow 102, by means of a biasing spring 103. The biasing spring has a substantially serpentine configuration of which a first arm, or branch, 103a thereof is substantially bowed and is positioned within the cavity 93. This bowed portion 103 makes point contact with the tip of head 69b on sensing pin 69. The biasing member 103 has three substantially hairpin curves, or U-shaped portions 103b, 103c and 103d, respectively, which segments or portions are all serially connected so that the biasing member has first and second surfaces 103e and 103f which bear against one another. With bowed portion 103a in cavity 93 and with the opposite end 103g of spring member 103 positioned in the opening 104 provided in housing 91 the biasing member 103 is designed so that the bowed portion 103 will exert sufficient contact pressure upon sensing pin 69 and further so that sufficient contact pressure will be exerted by surface 103e against surface 103f. Each biasing spring member 103 is restrained from any lateral movement relative to the spring position of FIGURE 4d by the ribs 100 and 101.

The manner in which the flexible printed circuit cooperates with the sensing pin assembly can best be seen from a consideration of FIGURES 4a and 8a. FIGURE 4a shows a typical flexible printed circuit assembly 100, only a section of which is shown therein for purposes of simplicity. The flexible printed circuit assembly 110 is comprised of a flexible insulating member 111 which acts as the insulating substrate for the printed circuit. The substrate has provided thereon by means of any suitable printed circuit techniques a plurality of spaced parallel conductive elements 112a–112g, respectively. The top surfaces, i.e., the surfaces opposite those which bear or make physical contact with the insulating substrate 111 are completely bare so as to be free to make electrical contact with any electrical elements which make physical engagement with these conductive elements. The width W of the flexible printed circuit assembly 110 is just slightly less than the width W' of the cavity 99 (see FIGURE 4d) so as to be insertable into cavity 99 in the manner shown in FIGURE 8a. The flexible printed circuit assembly 110 is inserted into the sensing pin assembly in the following manner:

The forward, or left-hand end, of the printed circuit assembly is bent over in the manner shown at the right of housing 91 of FIGURE 8a, such that the flexible insulating substrate 111 is on the interior side of the bend and so that the conductive members 112a–112g are on the outer side of the bend which occurs at 113. The bend at 113 is not a sharp bend, but is simply a curving over of the flexible circuit assembly 110. This is done so as not to rupture or otherwise damage the conductive elements 112a–112g provided on the surface of the insulating substrate 111.

The flexible assembly 110 is then moved in the direction shown by arrow 114 until it is positioned within the cavity 99 in the manner shown in FIGURE 8a. As can clearly be seen in this figure, the portion 103e makes both physical and electrical engagement with one of the associated conductors 112a–112g. The portion 103f of the biasing member makes physical and electrical contact with the same conductive member as the upper surface 103e engages. The nature of the biasing member 103 is such that the spring acts downwardly at the point 103e and upwardly at the point 103f so as to make an extremely good pressure fit between the biasing member and the conductor of the flexible printed circuit, by bending the flexible printed circuit in the manner shown so as to form a loop and further so as not to crease the flexible circuit which is so bent at 113 allows the natural resiliency of the flexible circuit assembly to urge its exposed surfaces which make contact at 103e and 103f outward against the biasing member to further improve and enhance the pressure fit therebetween. Each of the seven biasing members 103 makes a like pressure fit with its associated conductor 112a–112g, respectively, of the flexible printed circuit assembly 110. Thus, all seven biasing members cooperate to provide excellent mechanical and electrical contact between the sensing members and their associated conductors 112a–112g, respectively. While the exemplary embodiments described herein teach the use of seven sensing pins and hence seven biasing members and seven lead conductors, it should be understood that a greater or lesser number will be employed dependent only upon the needs of the user and the total number of sensing pins and hence annular rings on the code disc 30 of FIGURE 3 lends no novelty to the device of the instant invention. It can be seen from the above description that no additional fastening means is required between the biasing springs and the flexible printed circuit assemblies 91 and 110, respectively, thus making the job of connection therebetween a simple and yet reliable one. It should be understood that the removal of the flexible printed circuit may be performed as easily as the mounting thereof, thus greatly facilitating maintenance responsibilities as well as initial installation responsibilities.

Still another alternative embodiment of the sensing pin assemblies 60 and 90 is shown in FIGURES 6a–6c wherein a sensing pin assembly 130 is shown therein comprised of a molded plastic housing 131. While plastic is a preferable material, the housing may be molded of either one or two pieces of any other suitable insulating material. The housing 131 is provided with a hook-shaped projection 132 similar in both design and function to the hook-shaped projections 92 and 76 of the assemblies 90 and 60, respectively. One end of the housing 131 is provided with an aperture 133 which is suitably tapped for receiving a fastening member similar to the fastening member 78 shown in FIGURE 1c. The housing 131 is provided with a ledge 134 having a plurality of openings 135, each being adapted to receive a sensing pin such as, for example, the sensing pin 69 shown in FIGURE 6b. The housing is further provided with first and second cavities at 136 and 137 both communicating with the exterior of housing 131 by means of an opening 138 at one end thereof. There are seven such cavity pairs 136–137, each being spaced from the other by means of spacers or ribs 139, which can best be seen in FIGURE 6c. Each of the cavity pairs 136–137 is designed to receive a biasing member 140 having a substantially straight arm 141 and being bent at 142 to form a hairpin configuration having a straight arm 141 as previously described and a second arm 143 of serpentine configuration. The serpentine shaped arm has first, second and third arcuate shaped segments 143a, 143b and 143c, respectively, arranged in a serial fashion and with the segments 143c and 143a bearing against the interior wall 137a of cavity 137 and with the segment 143b bearing against the wall 137b of cavity 137. A portion of the bend 142 in biasing member 140 bears up against an arcuate shaped contour 136a in cavity 136. The walls 136b and 136c of cavity 136 are flared out in the manner shown, to permit the arm 141 to undergo lateral movement in either an upward or downward direction. The arm 141 makes both physical and electrical contact with the head of the sensing pin 69. The sensing pin assembly 130 is adapted for receiving a flexible printed circuit member which is inserted in the lower portion of opening 138 so that the conductive elements therein are arranged to make both physical and electrical contact with the surfaces of segment portions 143a and 143c. In the embodiment of FIGURES 6a–6c the arrangement is such that the flexible printed circuit assembly need not be bent over in the manner shown in FIGURE 8a, but simply is pressed or pushed into position in the cavity 137. The embodiment of FIGURES 6a–6c has the flexibility and capabilities of the embodiments 60 and 90, previously described, with the modification that the pressure fit between the flexible printed circuit element which is inserted in the position shown by the arrow 145 need not be bent over in the manner shown for the assembly 90. In all other respects, the operation is substantially identical.

FIGURES 7a–7j show still other alternative embodiments for sensing pin assemblies, which may be employed in the place of any of the embodiments 60, 90 and 130 previously described.

FIGURE 7a shows a sensing pin assembly 200 having a housing 201 provided with cavities 202 and 203. These cavities are joined at one end with an opening 204 adapted for receiving a biasing means 205. An arm 206 of the biasing spring 205 bears against the head of a sensing pin 69 positioned through an opening 207 in housing 201. A biasing spring has two serpentine portions 208 and 209. Spacers, or ribs 210 and 211 are provided in cavities 202 and 203, respectively, for the purpose of separating each of the biasing springs 205 from one another. It should be understood that the housing 201 is substantially similar to the housings described previously in which a plurality of biasing springs are provided. In the arrangement of FIGURE 7a, the flexible printed circuitry may be inserted through either cavity 202 or 203 making a pressure fit with either the serpentine portion 208 or 209, respectively, in the same manner as described previously. Preferably in the embodiment of FIGURE 7a the flexible printed circuit member is inserted to make pressure contact with the serpentine portion 209.

A threaded opening 212 is provided in the housing 201 for the purpose of securing the housing to the face plate of FIGURES 1a–1c in the manner as previously described.

The embodiment of FIGURE 7b resembles that of FIGURE 7a with like elements being designated with like numerals. The basic distinction between FIGURES 7 and 7a is that of the biasing spring member wherein the straight arm portion 206a forms the left-hand arm of the substantially U-shaped biasing spring 205, where the straight arm portion 206 of FIGURE 7 forms the right-hand arm of the substantially hair-pin shaped biasing spring 205. This straight arm portion 206a bears against the sensing pin 69 to provide the desired contact pressure. In addition, the housing 201a is provided with a cavity 213 to receive and position the extreme tip 214a of spring member 205 in order to maintain biasing spring 205a within the housing 201a.

The embodiment 200 of FIGURE 7b is substantially similar to the embodiment 200a of FIGURE 7a and differs in that merely a shoulder 215b is provided for the extreme tip 214a of biasing spring 214b of biasing spring 205b for positioning purposes. The flexible printed circuit element is positioned against the serpentine portion 209b and is inserted in the direction shown by arrow 216b.

FIGURE 7c shows an embodiment 300 comprised of a housing 301 having a substantially centrally located opening 302 for receiving a sensing pin 69. The opening 302 communicates at one end thereof with a wider diameter opening 303 which forms a ledge 304 and cooperates with the sensing pin head 69b to limit the movement of the sensing pin 69 in the direction of arrow 305. The opening extends through to the left-hand surface 306 of housing 301 since the housing 301 may be formed from a unitary piece of insulating material by a method such as, for example, an injection molding method. The opening 303 permits the sensing pin 69 to be inserted through the opening in the direction shown by arrow 307. The sensing pin is biased in the direction of arrow 305 by means of the biasing spring 308. The spring member is a substantially symmetrical member having a bowed intermediate portion 309 bent at its ends to form substantially complete egg-shaped loops 310 and 311 at the opposite ends thereof. The biasing member 308 is positioned within a cavity 312 provided in the housing, which cavity is further provided with spacers or ribs 313 and 314 to separate all of the biasing members 308 from one another, in the same manner as previously described. First arcuate surfaces 310a and 311a of loops 310 and 311 bear against the interior surface 315 of cavity 312. The sharp bends 310b and 311b bear against the corners provided within the cavity 312 to position and secure the biasing member 308 within the cavity 312 in a positive manner. The flexible printed circuit member is inserted within the cavity 312 of housing 301 as shown by the arrow 316. The arcuate portions 310a and 311a provide the mechanical and electrical contact between the printed circuit member and the biasing member 308. The tapped aperture 317 is provided for the purpose of securing the housing 301 to the faec plate shown in FIGURES 1a–1c.

FIGURE 7d shows an embodiment similar to that of FIGURE 7c with like numerals designating like elements. The basic distinction between the embodiments of FIG- URES 7c and 7d is that the biasing spring member 308a of FIGURE 7d, while being provided with a bowed central portion 309a, has its ends bent inwardly at 318a and 319a to form the U-shaped or hairpin-shaped loops 320a and 321a, respectively, at opposite ends theerof. Although the flexible printed circuit element (not shown) is inserted in the same manner as shown in FIGURE 7c at the position of arrow 316a, the loops 320a and 321a provide contact pressure along a greater surface of the interior wall 322a of the housing 301a.

The embodiment 300b of FIGURE 7e differs from the embodiments 300 and 300a of FIGURES 7c and 7d, respectively, in that the over-all design of the biasing spring 308b is a substantially U-shaped or hairpin shaped member having a first bow shaped arm 323 which makes pressure contact with the head 69b of sensing pin 69. The opposite arm 324b is provided with a U-shaped bend 325b intermedaite the over-all length of the arm which is so designed as to lodge itself within the opening 303b for positioning and securement purposes. The extreme ends 326b and 327b of arms 324a and 324b, respectively, are curved and make wiping contact with each other. The extreme tip of the curved portion 326b bears against the interior surface 315b of the cavity 312. The flexible printed circuit element (not shown) may be inserted within cavity 312 in the same manner as previously described and in the direction shown by arrow 316b. With the U-shaped bend 325b provided in the biasing spring 308b the flexible printed circuit element need be inserted in only half the distance previously described. In the embodiment of FIGURE 7e, as well as that of FIGURES 7c and 7d, it should be understood that it is not necessary to loop over the flexible printed circuit element in order to insure adequate contact pressure between the printed circuit element and the individual biasing springs.

The embodiment 300c of FIGURE 7f differs from that of the embodiments 300b in that the biasing spring 308c has an arm 324c which is substantially symmetrical about the U-shaped bend 325c provided in the arm. The arm 324c is also serpentine shaped on opposite sides of the U-shaped bend 325c, being much more severely curved than the arm 324b of FIGURE 7e. These serpentine portions on opposite sides of the U-shaped bend 325c bear against the interior surface 315c of cavity 312 and also bear against one surface 331c of a rib 330c provided on spacer rib 329 in order to provide adequate contact pressure between the biasing spring arm 324c of the housing 301c.

The opposite arm 323c of the biasing spring 308c has its opposite ends bearing against the rib 330c and its intermediate portion bearing against the head 69b of sensing pin 69. Spacer 328c which extends from the surface 315c of housing 301c acts to separate the arms 324c of each biasing spring from one another.

FIGURE 7g shows an embodiment 300d having a housing 301d substantially identical to the housing 301c of FIGURE 7f. The assembly 300d differs from the assembly 300c in that the biasing spring member 308d has a first serpentine shaped arm 324d which lacks the U-shaped bend 325c of FIGURE 7f.

In order to compensate for the removal of the U-shaped bend 325c which is used for positioning and securement purposes, the biasing member 308d has the arm 323d provided with a sharply bent portion 333d at the extreme end thereof so as to curve around the rig 330d. This causes the biasing member 308d to be captured about the rib 323d for proper position and securement thereof. The serpentine shaped arm 324d provides a desired contact pressure between the housing 301d and the biasing spring 308d as well as providing for the receipt of the flexible printed circuit member (not shown) within the cavity 312d and inserted within the direction shown by the arrow 316d.

The embodiment 300e of FIGURE 7h shows still another substantially symmetrically shaped biasing spring 308e having a bowed central portion 334e with inwardly bent arms 335e and 336e at opposite ends thereof. Each arm is provided with a sharp bend 337e and 338e respectively, which cooperate with the projecting ribs 339e and 340e respectively, which ribs project from a spacer rib 329e provided within the cavity 312e of the housing 301e. The arms 335e and 336e bear against the interior wall 315e to provide suitable contact pressure between biasing spring 308e and housing 301e as well as providing suitable contact pressure between the biasing spring 308e and the flexible printed circuit member (not shown) which is inserted therein in the direction shown by arrow 316e.

It can be seen from the foregoing descriptions that the instant invention provides a novel meter register gear encoder assembly having the features of providing the identical functions of prior art meter registers by providing a visually readable indication on the face plate of the assembly of the amount of units being measured which have been consumed as well as providing novel shaft encoding capabilities within the meter register by providing code discs on each of the gear members within the meter register, thus adding an additional capability to the meter register without the necessity for redesign or the addition of added components to the assembly. The code discs are read by novel sensing pin assemblies which are readily adaptable for mounting to the meter register. The sensing pin assembly is so designed as to permit its alignment with its associated code disc to be performed very simply and very quickly. The sensing pin housing and biasing spring elements are further designed so as to provide excellent contact pressure between connecting leads and the sensing pins, completely avoiding the need for any additional fastening means such as, screws, solder, et cetera, due to the unique design of the individual sensing pin biasing members.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Register means for providing a visually observable indication for meters and the like, comprising a plurality of dial means; input means for receiving an output from a meter; gear means driven by said input means and having a plurality of pointers cooperating with said dial faces to provide a visually observable reading; said gear means comprising a plurality of gear members associated with each of said dial means; each of said gear members comprising encoder means each having a first surface thereof making surface contact with and being secured to substantially the entire surface of one face of an associated gear member for digitizing the angular position of said gear member; a plurality of sensing means associated with a second surface of each of said encoder means for reading the digital output of said encoder means.

2. The register means of claim 1 wherein said encoder means is further comprised of a plurality of arcuate shaped conductive segments arranged in annular rings upon said gear member in a predetermined pattern to generate a digital representation of said gear angular position.

3. The register means of claim 2 wherein said gear member is an insulating member.

4. The register means of claim 3 wherein said conductive segments are comprised of a printed circuit formed on one surface of said gear member.

5. Register means for providing a visually observable indication for meters and the like comprising a plurality of dial means; input means for receiving an output from a meter; gear means driven by said input means and having a plurality of pointers cooperating with said dial faces to provide a visually observable reading; said gear means comprising a plurality of gear members associated with each of said dial means; each of said gear members comprising encoder means for digitizing the angular position of said gear member; a plurality of sensing means associated with each of said encoder means for reading the digital output of said encoder means; said encoder means comprising a plurality of arcuate shaped conductive segments arranged in annular rings directly upon one surface of said gear member in a predetermined pattern to generate a digital representation of said gear angular position; said conductive segments being arranged to generate a "two out of five" binary code; further conductive means for generating an ambiguity bit in the transition region between two adjacent decimal numbers provided on said dial means.

6. Register means for providing a visually observable indication for meters and the like comprising a plurality of dial means; input means for receiving an output from a meter; gear means driven by said input means and having a plurality of pointers cooperating with said dial faces to provide a visually observable reading; said gear means comprising a plurality of gear members associated with each of said dial means; each of said gear members comprising encoder means each having a first surface thereof making surface contact with and being secured to substantially the entire surface of one face of an associated gear member for digitizing the angular position of said gear member; a plurality of sensing means associated with a second surface of each of said encoder means for reading the digital output of said encoder means; said sensing means comprising housing means rotatably mounted to said register means; a plurality of sensing members reciprocally mounted within said housing means; a plurality of biasing means removably positioned within said housing and retained therein by pressure contact with said housing means and having a portion thereof arranged transverse to an associated one of said sensing members for urging an associated one of said sensing members into wiping engagement with said encoder means; said biasing means providing the electrical output connection for said sensing pins.

7. The register means of claim 6 further comprising conductor means for connecting said encoder means output to a utilization device; said housing means having an opening to removably receive one end of said conductor means; said biasing members being arranged to make pressure contact with said conductor means within said opening to provide adequate electrical contact between said conductor means and said biasing means without the need for additional fastening means.

8. Register means for providing a visually observable indication for meters and the like comprising a plurality of dial means; input means for receiving an output from a meter; gear means driven by said input means and having a plurality of pointers cooperating with said dial faces to provide a visually observable reading; said gear means comprising a plurality of gear members associated with each of said dial means; each of said gear members comprising encoder means for digitizing the angular position of said gear member; a plurality of sensing means associated with each of said encoder means for reading the digital output of said encoder means; said sensing means comprising housing means rotatably mounted to said register means; a plurality of sensing members reciprocally mounted in said housing means; a plurality of biasing means positioned within said housing means for urging an associated one of said sensing members into wiping engagement with said encoder means; said biasing means providing the electrical output connection for said sensing pins; conductor means for connecting said encoder means output to a utilization device; said housing means having an opening to receive one end of said conductor means; said biasing members being arranged to make pressure contact with said conductor means within said open end to provide adequate electrical contact between said conductor means and said biasing means without the need for additional fastening means; said conductor means being a substantially flat flexible printed circuit means having a plurality of spaced conductors on one surface thereof arranged to make contact with an associated biasing member of said sensing means when positioned in said opening.

9. Register means for providing a visually observable indication for meters and the like comprising a plurality of dial means; input means for receiving an output from a meter; gear means driven by said input means and having a plurality of pointers cooperating with said dial faces to provide a visually observable reading; said gear means comprising a plurality of gear members associated with each of said dial means; each of said gear members comprising encoder means each having a first surface thereof making surface contact with and being secured to substantially the entire surface of one face of an associated gear member for digitizing the angular position of said gear member; a plurality of sensing means associated with a second surface of each of said encoder means for reading the digital output of said encoder means; said encoder means comprising a plurality of arcuate shaped conductive segments arranged in annular rings upon said gear member in a predetermined pattern to generate a digital representation of said gear angular position; said conductive segments being arranged to generate a "two out of five" binary code; further conductive means for generating an ambiguity bit in the transition region between two adjacent decimal numbers provided on said dial means; sensing means for register-encoder means comprising housing means rotatably mounted to said register means; a plurality of sensing pins reciprocally mounted in said housing means; a plurality of biasing means removably positioned within said housing means for urging an associated one of said sensing members into wiping engagement with said encoder means; said biasing means providing the electrical output connection for said sensing pins.

10. Register means for providing a visually observable indication for meters and the like comprising a plurality of dial means; input means for receiving an output from a meter; gear means driven by said input means and having a plurality of pointers cooperating with said dial faces to provide a visually observable reading; said gear means comprising a plurality of gear members associated with each of said dial means; each of said gear members comprising encoder means for digitizing the angular position of said gear member; a plurality of sensing means associated with each of said encoder means for reading the digital output of said encoder means; said encoder means comprising a plurality of arcuate shaped conductive segments arranged in annular rings upon said gear member in a predetermined pattern to generate a digital representation of said gear angular position; said conductive segments being arranged to generate a "two out of five" binary code; further conductive means for generating an ambiguity bit in the transition region between two adjacent decimal numbers provided on said dial means; sensing means for register-encoder means comprising housing means rotatably mounted to said register means; a plurality of sensing members reciprocally mounted in said housing means; a plurality of biasing means positioned within said housing means for urging an associated one of said sensing members into wiping engagement with said encoder means; said biasing means providing the electrical output connection for said sensing pins; conductor means for connecting said encoder means output to a utilization device; said housing means having an opening to receive one end of said conductor means; said biasing members being arranged to make pressure contact with said conductor means within said open end to provide adequate electrical contact between said conductor means and said biasing means without the need for additional fastening means.

11. Register means for providing a visually observable indication for meters and the like comprising a plurality of dial means; input means for receiving an output from a meter; gear means driven by said input means and having a plurality of pointers cooperating with said dial faces to provide a visually observable reading; said gear means comprising a plurality of gear members associated with each of said dial means; each of said gear members comprising encoder means for digitizing the angular position of said gear member; a plurality of sensing means associated with each of said encoder means for reading the digital output of said encoder means; said encoder means comprising a plurality of arcuate shaped conductive segments arranged in annular rings upon said gear member in a predetermined pattern to generate a digital representation of said gear angular position; said conductive segments being arranged to generate a "two out of five" binary code; further conductive means for generating an ambiguity bit in the transition region between two adjacent decimal numbers provided on said dial means; sensing means for register-encoder means comprising housing means rotatably mounted to said register means; a plurality of sensing members reciprocally mounted in said housing means; a plurality of biasing means positioned within said housing means for urging an associated one of said sensing members into wiping engagement with said encoder means; said biasing means providing the electrical output connection for said sensing pins; conductor means for connecting said encoder means output to a utilization device; said housing means having an opening to receive one end of said conductor means; said biasing members being arranged to make pressure contact with said conductor means within said open end to provide adequate electrical contact between said conductor means and said biasing means without the need for additional fastening means; said conductor means being a substantially flat flexible printed circuit means having a plurality of spaced conductors on one surface thereof arranged to make contact with an associated biasing member of said sensing means when positioned in said opening.

12. Register means for providing a visually observable indication for meters and the like comprising a plurality of dial means; input means for receiving an output from a meter; gear means driven by said input means and having a plurality of pointers cooperating with said dial faces to provide a visually observable reading; said gear means comprising a plurality of gear members associated with each of said dial means; each of said gear members comprising encoder means each having a first surface thereof making surface contact with and being secured to substantially the entire surface of one face of an associated gear member for digitizing the angular position of said gear member; a plurality of sensing means associated with a second surface of each of said encoder means for reading the digital output of said encoder means; said encoder means comprising a plurality of arcuate shaped conductive segments arranged in annular rings upon said gear member in a predetermined pattern to generate a digital representation of said gear angular position; said conductive segments being arranged to generate a "two out of five" binary code; further conductive means for generating an ambiguity bit in the transition region between two adjacent decimal numbers provided on said dial means; sensing means for register-encoder means comprising housing means rotatably mounted to said register means; a plurality of sensing members reciprocally mounted in said housing means; a plurality of biasing means positioned within said housing means for urging an associated one of said sensing members into wiping engagement with said encoder means; said biasing means providing the electrical output connection for said sensing pins; said housing means being formed of an insulating material for electrically insulating said sensing pins from one another.

13. Register means for providing a visually observable indication for meters and the like comprising a plurality of dial means; input means for receiving an output from a meter; gear means driven by said input means and having a plurality of pointers cooperating with said dial faces to provide a visually observable reading; said gear means comprising a plurality of gear members associated with each of said dial means; each of said gear members comprising encoder means each having a first surface thereof making surface contact with and being secured to substantially the entire surface of one face of an associated gear member for digitizing the angular position of said gear member; a plurality of sensing means associated with a second surface of each of said encoder means for reading the digital output of said encoder means; said encoder means comprising a plurality of arcuate shaped conductive segments arranged in annular rings upon said gear member in a predetermined pattern to generate a digital representation of said gear angular position; said conductive segments being arranged to generate a "two out of five" binary code; further conductive means for generating an ambiguity bit in the transition region between two adjacent decimal numbers provided on said dial means; sensing means for register-encoder means comprising housing means rotatably mounted to said register means; a plurality of sensing members reciprocally mounted in said housing means; a plurality of biasing means positioned within said housing means for urging an associated one of said sensing members into wiping engagement with said encoder means; said biasing means providing the electrical output connection for said sensing pins; said housing means opening forming one end of a cavity for receiving each of said biasing members; said cavity being formed to index and removably position and secure each of said biasing members in said housing means.

14. Register means for providing a visually observable indication for meters and the like comprising a plurality of dial means; input means for receiving an output from a meter; gear means driven by said input means and having a plurality of pointers cooperating with said dial faces to provide a visually observable reading; said gear means comprising a plurality of gear members associated with each of said dial means; each of said gear members comprising encoder means secured to one face of each of said gear members for digitizing the angular position of said gear member; a plurality of sensing means associated with each of said encoder means for reading the digital output of said encoder means; said encoder means comprising a plurality of arcuate shaped conductive segments arranged in annular rings upon said gear member in a predetermined pattern to generate a digital representation of said gear angular position; said conductive segments being arranged to generate a "two out of five" binary code; further conductive means for generating an ambiguity bit in the transition region between two adjacent decimal numbers provided on said dial means; sensing means for register-encoder means comprising housing means rotatably mounted to said register means; a plurality of sensing members reciprocally mounted in said housing means; a plurality of biasing means positioned within said housing means for urging an associated one of said sensing members into wiping engagement with said encoder means; said biasing means providing the electrical output connection for said sensing pins; said housing means further comprising a hook shaped projection partially surrounding a gear shaft to which an associated gear is mounted for positioning said housing means relative to an associated encoder means while allowing said gear shaft to rotate free of interference from said hook-shaped projection; said housing means having an aperture spaced from said projection;

fastening means threadedly engaging said aperture for securing said housing means to said register means after being properly aligned relative to said encoder means.

15. Register means for providing a visually observable indication for meters and the like, comprising a plurality of dial means; input means for receiving an output from a meter; gear means driven by said input means and having a plurality of pointers cooperating with said dial faces to provide a visually observable reading; said gear means comprising a plurality of gear members associated with each of said dial means; each of said gear members comprising encoder means secured to one face of each gear member for digitizing the angular position of said gear member; a plurality of sensing means associated with each of said encoder means for reading the digital output of said encoder means; each of said sensing means comprising a flexible conductive spring member; said housing means having a plurality of cavities for receiving each of said spring members, and a plurality of openings each being arranged substantially transverse to an associated cavity; a plurality of sensing pins each being reciprocally mounted within an associated opening, said spring members being positioned within an associated cavity so as to have the first portion thereof in pressure contact with one end of an associated sensing pin; conductor means for coupling said sensing means to an output being inserted into said cavities; each of said spring members making pressure contact with an associated conductor of said conductor means for establishing an electrical circuit between said sensing pins and said conductor means; said individual spring members providing in dependent pressure contact for each of said sensing pins.

16. The register means of claim 15 wherein each of said spring members is bent to form a curved configuration in the region of said spring member which engages said conductor means.

17. The register means of claim 16 wherein said conductor means is positioned against one wall of said cavity; said spring members being urged toward said wall to make adequate pressure contact with said conductor means. , 18. The register means of claim 16 wherein said housing means is provided with further means for removably retaining said spring members within their associated cavities.

19. The register means of claim 17 wherein each of said spring means is bent to form a U-shaped configuration for embracing said conductor means therebetween.

References Cited by the Examiner
UNITED STATES PATENTS

| | | | |
|---|---|---|---|
| 2,872,671 | 2/1959 | Walton | 340—347 |
| 2,880,410 | 3/1959 | Postman | 340—347 |
| 3,006,712 | 10/1961 | Eichacker | 346—14 |
| 3,165,732 | 1/1965 | Klosterman | 340—347 |
| 3,165,733 | 1/1965 | Brothman et al. | 340—347 |

MAYNARD R. WILBUR, *Primary Examiner.*

A. L. NEWMAN, *Assistant Examiner.*